(12) United States Patent
DeBerry et al.

(10) Patent No.: US 6,609,731 B2
(45) Date of Patent: Aug. 26, 2003

(54) CONNECTOR

(75) Inventors: Blake T. DeBerry, Spring, TX (US); Morris B. Wade, Houston, TX (US)

(73) Assignee: 2r.l-Quip

( * ) Notice: Subject to any disclaimer, the term of this patent is extended or adjusted under 35 U.S.C. 154(b) by 0 days.

(21) Appl. No.: 09/954,998

(22) Filed: Sep. 17, 2001

(65) Prior Publication Data

US 2002/0096878 A1 Jul. 25, 2002

Related U.S. Application Data

(60) Provisional application No. 60/233,742, filed on Sep. 19, 2000.

(51) Int. Cl.$^7$ ................................................. F16L 19/00
(52) U.S. Cl. ................................ 285/123.4; 285/123.1; 285/123.3; 285/900
(58) Field of Search ............................. 285/84, 85, 86, 285/123.1, 123.3, 123.4, 900, 920

(56) References Cited

U.S. PATENT DOCUMENTS

| | | | | |
|---|---|---|---|---|
| 2,313,169 A | * | 3/1943 | Penick et al. | 285/123.3 |
| 3,780,802 A | * | 12/1973 | Phipps et al. | 285/123.4 |
| 4,372,584 A | * | 2/1983 | Miller | 285/18 |
| 4,412,584 A | * | 11/1983 | Brandell | 285/123.3 |
| 4,433,859 A | | 2/1984 | Driver et al. | |
| 4,453,745 A | | 6/1984 | Nelson | |
| 4,526,406 A | | 7/1985 | Nelson | |
| 4,613,159 A | * | 9/1986 | Harris et al. | 285/900 |
| 4,641,708 A | * | 2/1987 | Wightman | 285/123.4 |
| 4,696,493 A | * | 9/1987 | Brammer | 285/39 |
| 4,699,215 A | | 10/1987 | Cuiper | |
| 4,819,967 A | | 4/1989 | Calder et al. | |
| 5,222,560 A | | 6/1993 | Brammer et al. | |
| 5,259,459 A | * | 11/1993 | Valka | 285/123.4 |
| 5,279,369 A | | 1/1994 | Brammer | |
| 5,368,335 A | * | 11/1994 | Dimes | 285/18 |
| 6,070,669 A | | 6/2000 | Radi et al. | |
| 6,234,252 B1 | | 5/2001 | Pallini, Jr. et al. | |
| 6,293,343 B1 | | 9/2001 | Pallini, Jr. et al. | |

FOREIGN PATENT DOCUMENTS

| GB | 2 129 895 A | 5/1984 |
|---|---|---|
| GB | 2 234 794 A | 2/1991 |

OTHER PUBLICATIONS

U.S. patent application Ser. No. 09/865,288, Pallini et al., filed May 25, 2001.

* cited by examiner

*Primary Examiner*—Lynne H. Browne
*Assistant Examiner*—James M. Hewitt
(74) *Attorney, Agent, or Firm*—Loren G. Helmreich; Browning Bushman P.C.

(57) ABSTRACT

A connector for connecting the lower tubular member of a tie-back to the upper tubular member of a subsea wellhead is disclosed as having a first sleeve carried about the upper member for axial reciprocation with respect thereto and extension over the lower member, and a second sleeve also carried by the upper tubular member for axial reciprocation thereto within the first sleeve. Each of the tubular members has locking grooves formed about its ends, and a normally expanded lock ring has about its ends to engage the grooves, as well as outer cam surfaces carried within inner cam surfaces on the inner sides of the sleeves for radial movement between a normally expanded unlocking position and a contracted locking position, as the sleeves are axially reciprocated in opposite directions with respect response to one another. A fluid operator is formed between the upper portions of the sleeves for moving them in opposite axial directions.

9 Claims, 6 Drawing Sheets

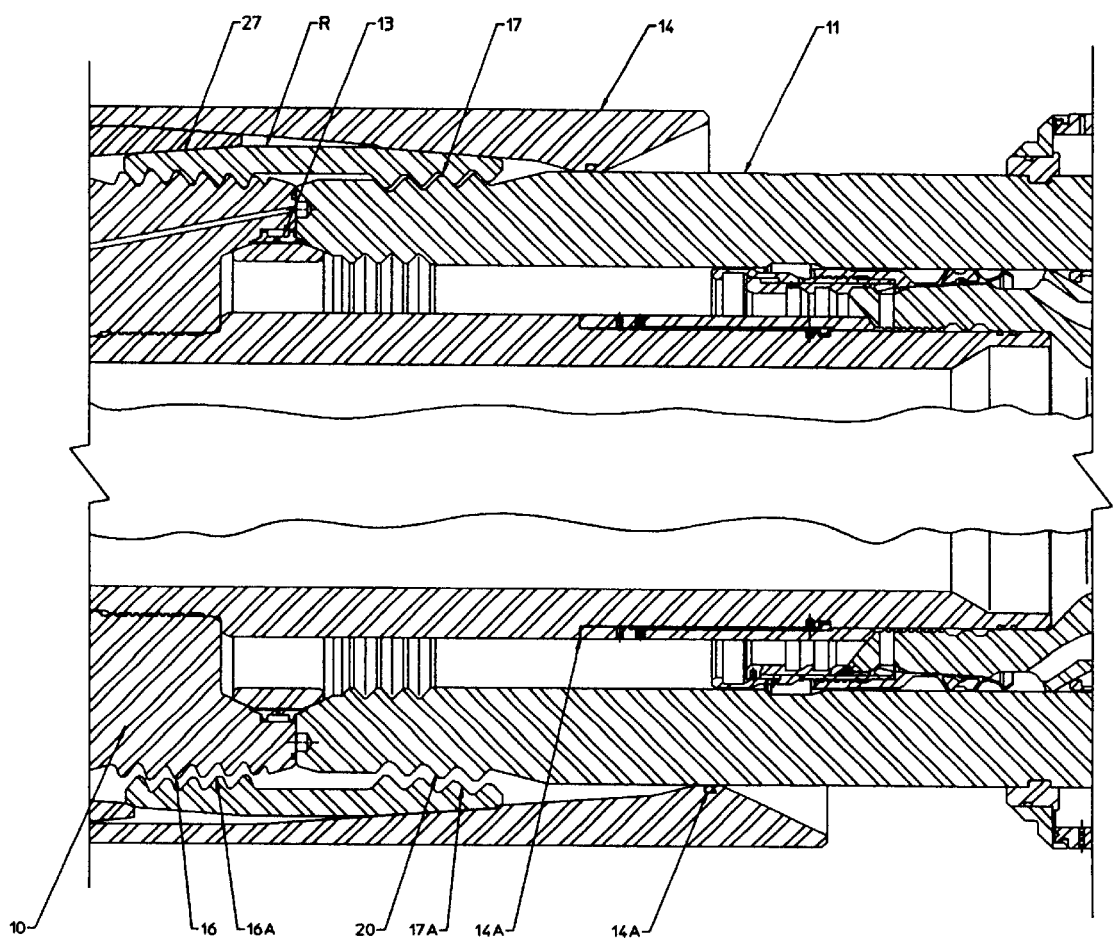

CONNECTOR

This application claims the benefit of Provisional Application Ser. No. 60/233,742, filed Sep. 19, 2000.

This invention relates generally to connectors for connecting tubular members in end-to-end relation. More particularly, it relates to an improved connector especially well suited for use in connecting tie-back risers to subsea wellhead systems.

BACKGROUND OF THE INVENTION

Prior connectors of this type have required only minimal capacity because the risers were tied back to fixed structures at the water surfaces. However, with the advent of float production type vessels (i.e. TLP, or SPAR), the required capacity of the connectors was increased due to the motion of the drilling vessel. Therefore, the connectors used in these applications were typically modified drilling connectors with large outside diameters.

On a SPAR type vessel, the risers are supported at the top with a buoyant air can system. The ID of these air cans must be sized to pass the tie-back connector OD, and the use of these large OD connectors resulted in large air can inner stems that increased the air can weight while reducing the buoyancy. As a result, the need for a slim OD external tie-back connector arises as water depths get deeper, and resulting riser weights get higher.

Thus, it is the primary object of this invention to provide a slim OD connector for this and other purposes.

Another object is to provide such a connector which is highly efficient in that it requires minimal operating pressure.

SUMMARY OF THE INVENTION

These and other objects are accomplished by a connector of this type which comprises, in its illustrated and preferred embodiment, first and second tubular members adapted to be disposed in end-to-end relation, each member having locking grooves thereabout adjacent its end, a first sleeve having one end carried about the first member for axial reciprocation with respect thereto and having its opposite end surrounding the end of the second member, when the members are arranged in end-to-end relation, and a second sleeve having one end carried about the first member and within the first sleeve for axial reciprocation with respect thereto. A radially expandable and contractible ring having axially spaced first and second teeth about its inner side is carried within the sleeves to permit it to be moved with the first sleeve over the end of the first member, when the sleeves are in a first axial position relative to one another, to permit the ring to assume its normally expanded position, and thereby dispose the first and second teeth opposite the first and second grooves, respectively.

The sleeves have inner cam surfaces adjacent their ends which are slidable over cam surfaces about the outer sides of the ring to urge the ring and its teeth inwardly to locking position with the grooves about the tubular members, when the sleeves are moved axially toward one another, and to permit the ring to expand to unlocking position, when the sleeves are moved axially away from one another. More particularly, operating means connects the opposite ends of the sleeves for selectively moving them in one direction relative to another, in order to move the ring to locking position, and in the opposite direction relative to one another to permit the ring to move to unlocking position. Thus, the connector provides high capacity while minimizing the required operating forces.

As illustrated, and in keeping with the need for a slim OD, the operating means preferably includes radially outwardly extending walls on the one end of the second sleeve sealable slidable within the one end of the first sleeve to form an annular space between them. A radially inwardly extending piston on the one end of the first sleeve intermediate the end walls is sealably slidable about the second sleeve to divide the space into fluid pressure chambers on its opposite sides, and means are provided by which operation fluid may be supplied to and from the chambers in order to selectively expand and contract the chambers and thereby move the ring between locking and unlocking positions.

Preferably, the inner and outer sides of the first and second sleeves have overlapping cam surfaces slidable over one another as the ring moves to locking position. It is also preferred that the connector includes means for preventing accidental displacement from its locked position by ratchet teeth and grooves on adjacent sides of the sleeves.

In accordance with another of its novel features, the connector may be provided with means external to the fluid pressure chambers for moving the sleeves to releasing position. As shown, this comprises a first abutment on the first sleeve, and a second abutment on the second sleeve which is axially spaced from the first abutment, whereby an extendible and retractable actuator may be installed between the abutments in order to move them axially apart.

BRIEF DESCRIPTION OF THE DRAWINGS

In the drawings, wherein like reference characters are used throughout to designate like parts.

FIGS. 3A and 3B are similar views of the bottom portions thereof.

Figure 1A:
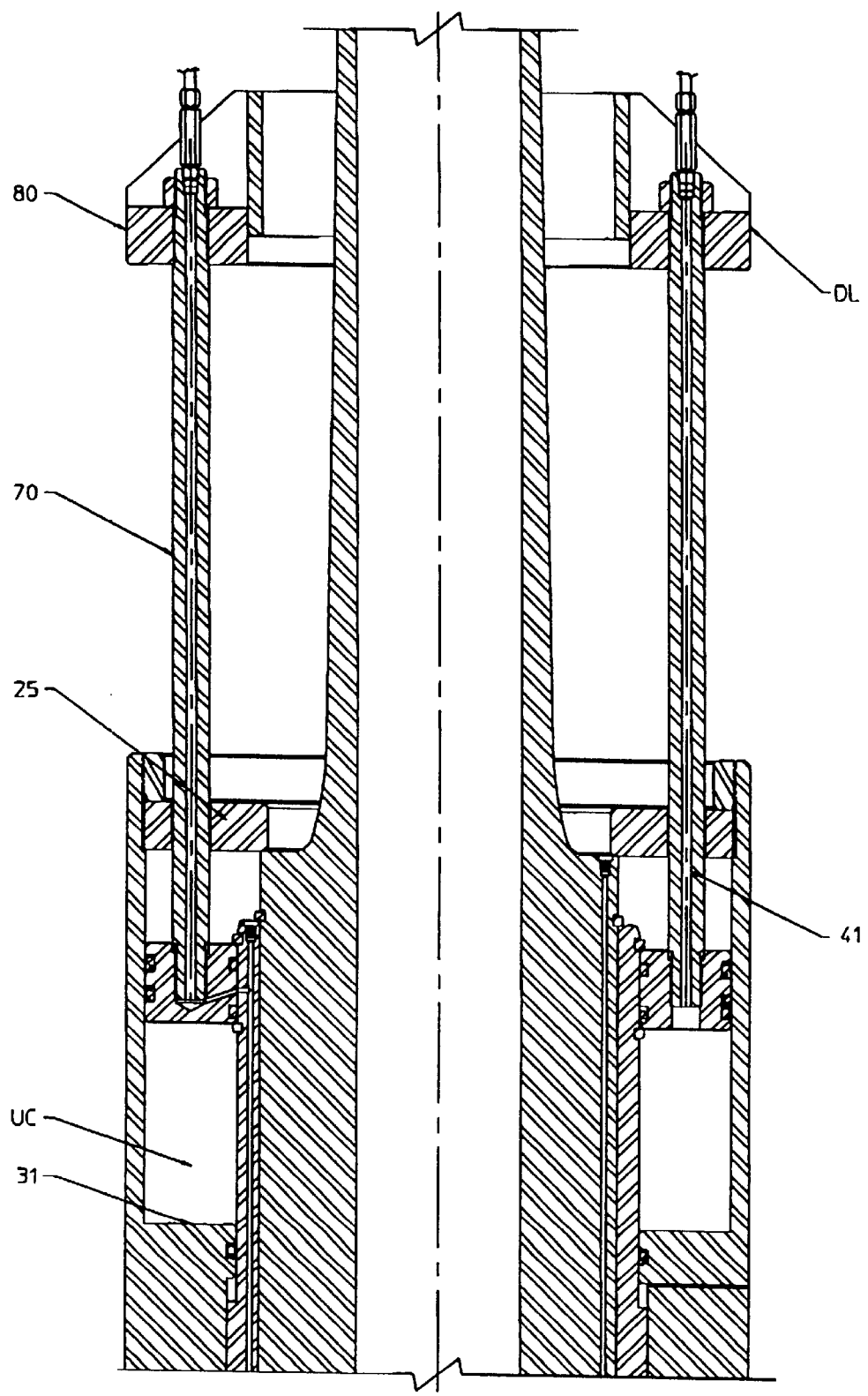
FIGS. 1A and 1B are sectional views of the left and right sides of the top portions of the connector in unlocked position.
Figure 1B:
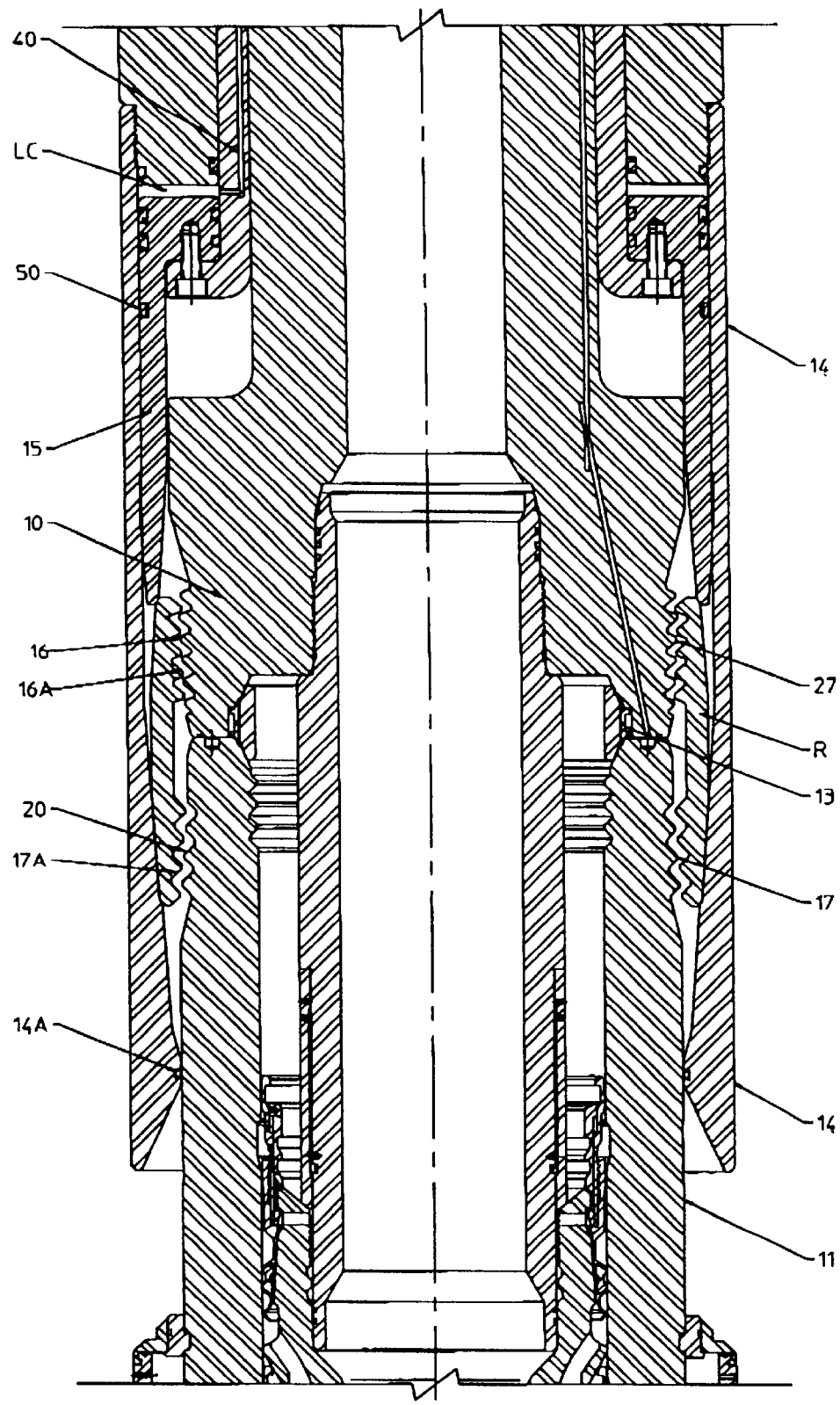
Figure 2A:
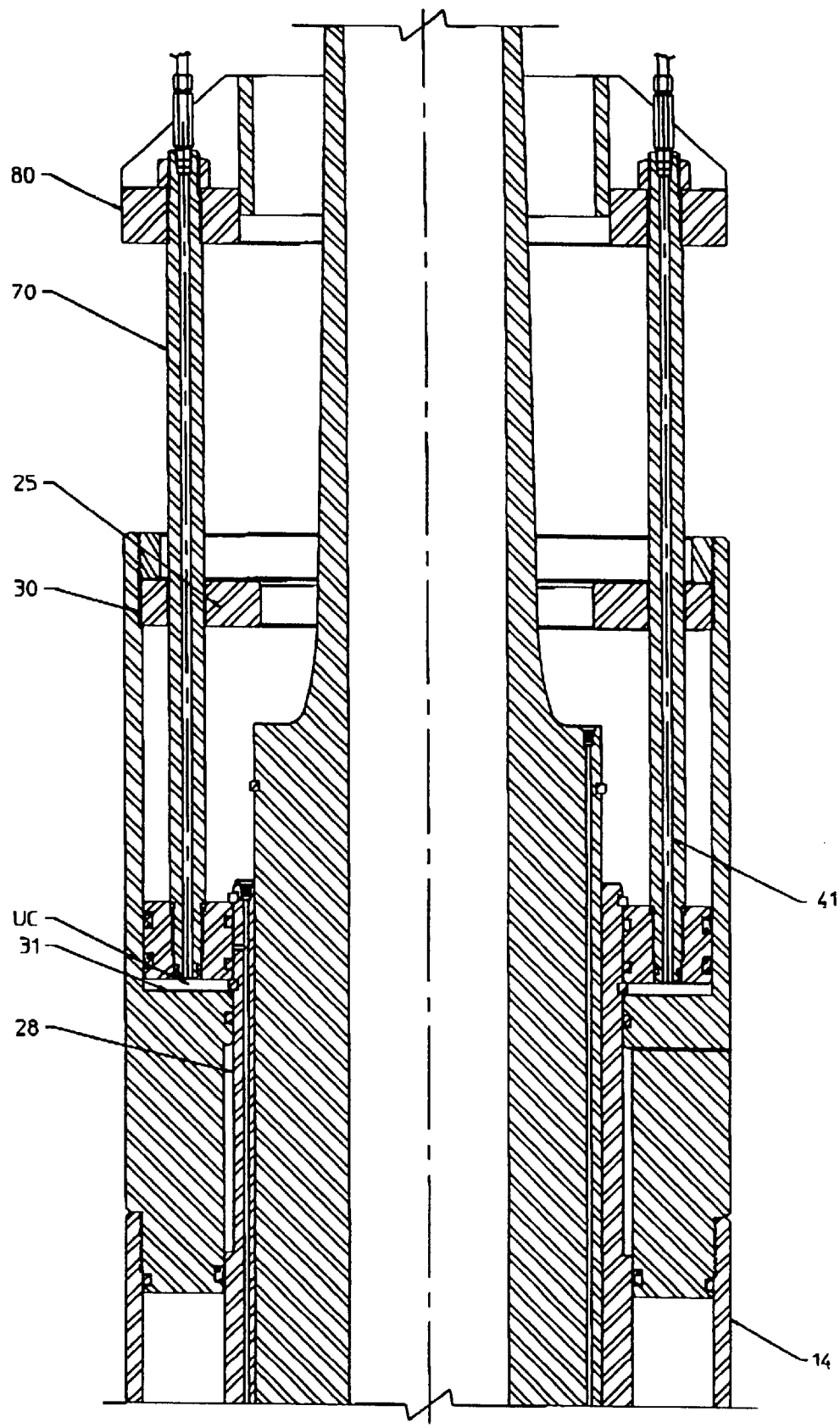
FIGS. 2A and 2B are similar views of the intermediate portions of the bottom portions thereof.
Figure 2B:
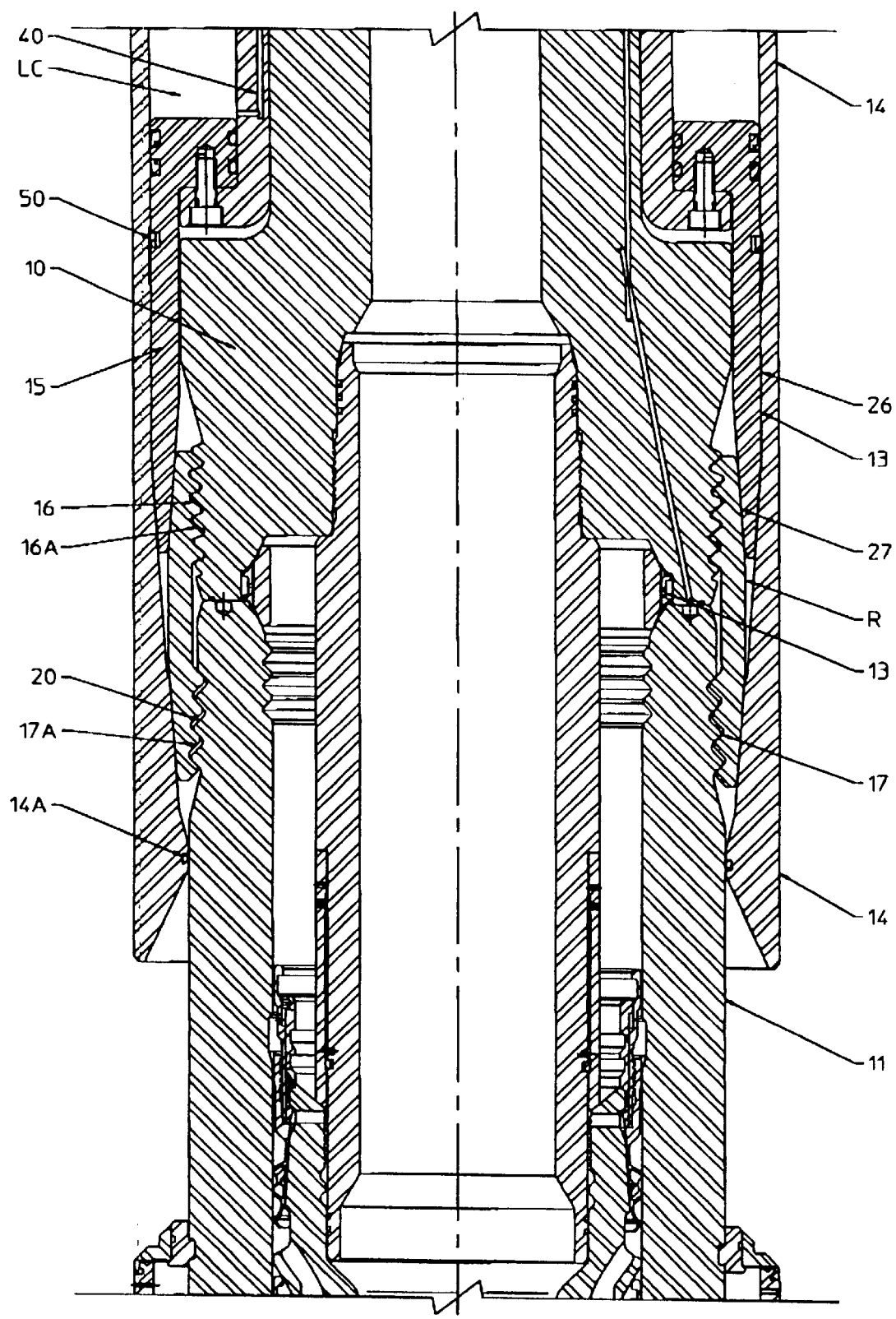

A first sleeve 14 has its upper end carried about the upper tubular member for extension downwardly over the upper portion of the lower tubular member. More particularly, the lower end of the first sleeve has an inwardly enlarged part 14A guideably slidable over the OD of the lower tubular member, and carrying a ring about its inner diameter to prevent debris from entering the space between the first sleeve and the outer sides of the tubular members. A second sleeve 15 is carried about the upper tubular member within the first sleeve for vertical reciprocation with respect to it and the upper tubular member.

The upper member 10 is provided with grooves 16 about its lower end, and the lower member 11 is provided with grooves 17 about its upper end. A split lock ring R carried on the inner sides of the sleeves has teeth 16A and 17A and is radially expandable and contractible between unlocked position in which the teeth are spaced from the grooves about the tubular members, and a locking position in which the ring has been forced inwardly to engage its teeth with the grooves and thereby lock the connection. Thus, the ring is radially moveable between a normally expanded, unlocking position and a radially contracted locking position. Preferably, the lock ring is split about its circumference so as to normally expand outwardly to its unlocking position. Alternatively, the lock ring may consist of segments joined to one another to cause it to normally assume a radially outward position, but be collapsible to contractible position.

As can be seen from a comparison of FIGS. 3A and 3B, the lock ring is moved between its outer or unlocked position, in which the upper tubular member may be lowered into or removed from end-to-end engagement with the lower tubular member, and a locked position by means of cam surfaces about the inner sides of first and second sleeves which are slidable over cam surfaces on the ring, so that movement of sleeves in opposite directions will force the ring inwardly to locked position.

The upper end of the first sleeve has an inwardly extending flange 25 supported on a shoulder about the upper tubular member when in its lowermost position, in which it frees the lock ring for expansion to unlocking position, the upper tubular member. On the other hand, raising the flange upon upward movement of the first sleeve cams the lock ring into locking engagement.

The second sleeve 15 is carried by the upper tubular member and has a cam surface 27 about the inner side of its lower end adapted to move downwardly over an upper cam surface on the lock ring. The second sleeve is adapted to be moved upwardly to permit the upper end of the lock ring to expand, and downwardly to a position in which the cam surface on its inner side slides over the cam surface about the upper outer side of the lock ring to cooperate with the first sleeve in moving the ring inwardly to locking position. In the preferred embodiment of the invention, and as shown in FIG. 3B, the outer side of the lower end of the second sleeve is tapered downwardly and inwardly for sliding within upper extension of the cam surface on the first sleeve.

The second sleeve has an outer side which is vertically slidable within the inner side of the first sleeve, and vertically spaced inward extensions thereof slide within the first sleeve and over a radially reduced portion of the outer surface of the upper tubular member to form an annular space between them. In the unlocked position of the connector, the lower side of the inner extension is spaced above the upper surface of the enlarged lower end of the upper tubular member so as to permit the second sleeve to move downwardly to the locking position. A piston 31 on the inner side of the first sleeve is sealably slidable within the annular space formed between the upper and lower outer extensions of second sleeve, so as to form upper and lower fluid pressure chambers UC and LC.

Passageway 40 extends through the second sleeve 15 and one of the rods at the upper end to connect with lower pressure chamber LC. Passageway 41 in the second sleeve and the other rod 70 connects the upper pressure chamber UC. Thus, the second sleeve is moved between its upper unlocking position and lower locking position in response to the alternate admission and venting of a source of pressure fluid from and to the chambers.

As will be appreciated in addition to its high mechanical advantage, the framework of the above described operating means minimizes the OD of the tool.

Figure 4:
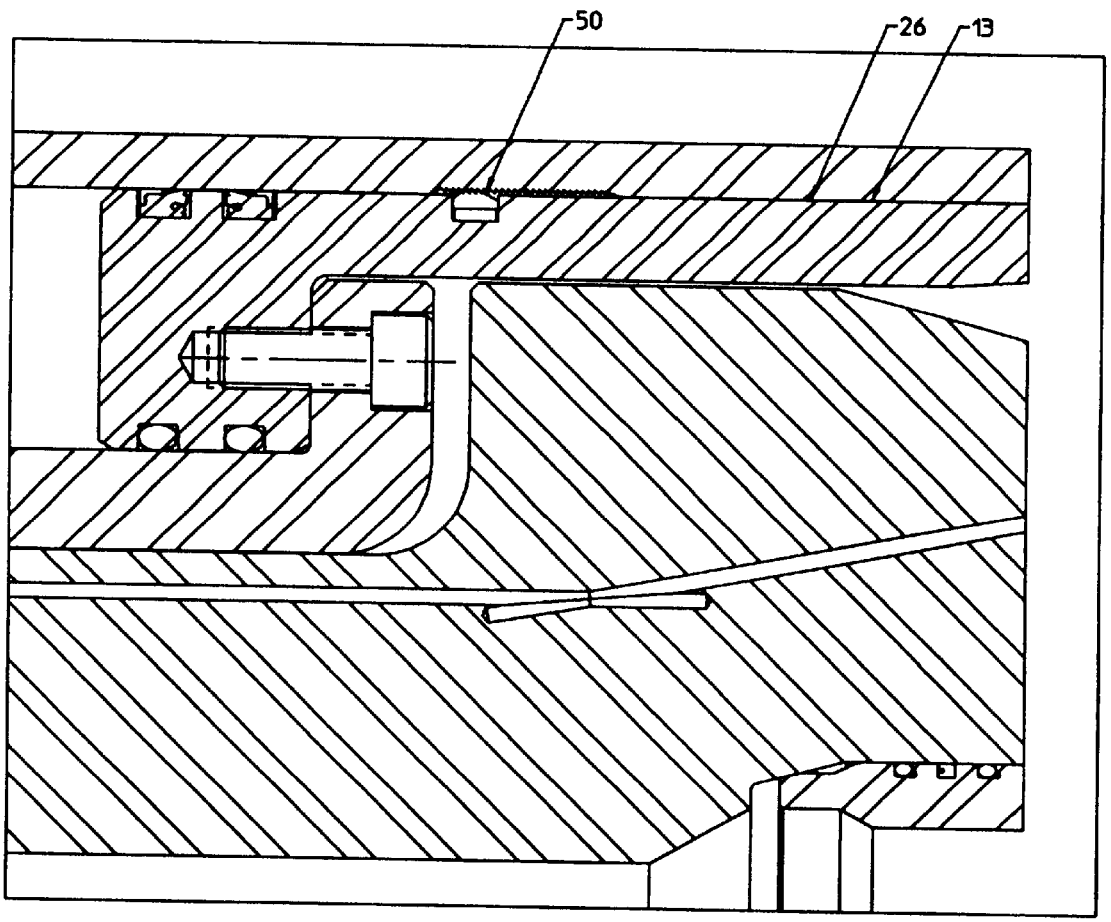
FIG. 4 is an enlarged detail view of a rachet mechanism shown in FIG. 2B to be installed between the sleeves for preventing accidental displacement of the connector from its locked position; and With reference now to the details of the above described connector, it comprises upper and lower tubular members 10 and 11 arranged in end-to-end relation, as shown, and having tapered surfaces about the inner diameters of their adjacent ends to receive a seal ring 13 therebetween. In the environment above described, the lower of the tubular members would be connected to a subsea wellhead member, and the upper of the tubular members to a tie-back adapted to extend upwardly to a riser or casing string adapted for extension upwardly to a surface wellhead.

A rachet ring 50 is carried about the outer diameter of the second sleeve for ratcheting over teeth on the inner diameter of the first sleeve. As a result, the sleeves will be held against accidental vertical displacement. However, the teeth are designed as to disengage in response to upward force applied to the second sleeve. The ring and its cooperation with the sleeves as shown in FIG. 4 on an enlarged scale.

The upper ends of the rods 70 carry an annular abutment 80 which surrounds the second member, so that oppositely facing radial surfaces are formed between the first and second sleeves to permit an extendable and retractable actuator (not shown) to be disposed between. Thus, in the event it is necessary to unlock the connector mechanically, one or more actuators may, when so disposed, be extended.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

As shown in FIGS. 3A and 3B, the upper body has a lower tubular extension 10B which passes into the upper end of the upper body to fit closely within the upper end of a casing hanger loaded in the upper end of a casing hanger landed in the upper end of the subsea wellhead member on which the lower body is mounted.

What is claimed is:

1. A connector, comprising:

first and second tubular members adapted to be disposed in end-to-end relation, each member having locking grooves thereabout adjacent one end thereof, a first sleeve having one end carried about the first member for axial reciprocation with respect thereto and having its other end surrounding the one end of the second member, when the members are arranged in end-to-end relation, a second sleeve having one end carried about the first member and within the first sleeve for axial reciprocation with respect thereto, a radially expandable and contractible ring having inner and outer sides and axially spaced first and second teeth about its inner side and carried within the first sleeve so that, in a normally expanded unlocking position, the other end of the first sleeve and ring may be moved over the one end of the second member and thereby dispose the first teeth of the ring opposite the grooves of the first member and the second teeth of the ring opposite the grooves of the second member respectively, each sleeve having a cam surface on its inner side adjacent its one end which is slidable over cam surfaces about the outer side of the ring to move the ring and its teeth radially inwardly to a locking position within the grooves about the tubular members when the sleeves are moved axially toward one another, and to permit the ring to expand radially outwardly to the unlocking position when the sleeves are moved axially away from one another, and operating means connecting the other ends of the sleeves for selectively moving them axially toward and away from one another to move the ring between the locking and unlocking positions.

2. A connector as in claim 1, wherein the operating means comprises:

radially outwardly extending walls on the second sleeve sealably slidable within the first sleeve to form an annular space between said walls, a piston on the first sleeve intermediate the walls of the second sleeve and sealably slidable axially about the second sleeve to divide the space into fluid pressure chambers on opposite sides of the piston, and means by which an operating fluid may be supplied fluid to and from each of the chambers in order to move the ring between the locking and unlocking positions.

3. As in claim 1, wherein:

the cam surfaces on the first and second sleeves are slidable over one another in order to wedge the ring inwardly as the ring moves to the locking position.

4. As in claim 1, including means for releasably holding the sleeves in the locking position.

5. As in claim 4, wherein said releasable holding means comprises ratchet teeth and grooves on adjacent sides of the sleeves.

6. As in claim 2, including additional means external to the fluid pressure chambers for moving the sleeves to positions for unlocking the ring.

7. As in claim 6, wherein said additional moving means comprises:

a first abutment on the first sleeve, and a second abutment on the second sleeve which is axially spaced from the first abutment, whereby an extendible and retractable actuator may be installed between the abutments in order to move them axially apart.

8. A connector, comprising:

first and second tubular members adapted to be disposed in end-to-end relation, each member having locking grooves thereabout adjacent one end thereof, a first sleeve having one end carried about the first member for axial reciprocation with respect thereto and having its other end surrounding one end of the second member, when the members are arranged in end-to-end relation, a second sleeve having one end carried about the first member and within the first sleeve for axial reciprocation with respect thereto, a radially expandable and contractible ring having inner and outer sides and axially spaced first and second teeth about its inner side and carried within the first and second sleeves so that, when the ring is in an expanded unlocking position, the other end of the first sleeve and ring may be moved over the one end of the second member and thereby dispose the first teeth of the ring opposite first groove of the first member and the second teeth of the ring opposite the grooves of the second, respectively, and, when the ring is in a contracted locking position, its teeth are locked within the grooves, each of said sleeves having cam surfaces on their inner sides and adjacent their one ends which are slidable over cam surfaces on the ring to move the ring from one radial position to the other radial position and thus into locking engagement within the grooves about the tubular members when the sleeves are moved axially toward one another, and to permit the ring to move to the other radial position, when the sleeves are moved axially away from one another, and operating means connecting the other ends of the sleeves for selectively moving them axially toward and away from one another to move the ring between the locking and unlocking positions.

9. A connector as in claim 8, wherein the operating means comprises:

radially outwardly extending walls on the second sleeve sealably slidable within the first sleeve to form an annular space between said walls, a piston on the first sleeve intermediate the walls of the second sleeve and sealably slidable axially about the second sleeve to divide the space into fluid pressure chambers on opposite sides of the piston, and means by which an operating fluid may be supplied fluid to and from each of the chambers in order to move the ring between the locking and unlocking positions.

* * * * *

UNITED STATES PATENT AND TRADEMARK OFFICE
CERTIFICATE OF CORRECTION

PATENT NO.   : 6,609,731 B2
DATED        : August 26, 2003
INVENTOR(S)  : Blake T. DeBerry and Morris B. Wade It is certified that error appears in the above-identified patent and that said Letters Patent is hereby corrected as shown below:

<u>Title page,</u>
Item [73], Assignee should read -- Dril-Quip, Inc. --

Signed and Sealed this

Thirteenth Day of April, 2004

JON W. DUDAS
*Acting Director of the United States Patent and Trademark Office*